United States Patent [19]

Schneider

[11] 4,347,422

[45] Aug. 31, 1982

[54] PROCESS AND APPARATUS FOR CONTROLLING THE ELECTRODE ON A SPARK EROSION MACHINE

[75] Inventor: Rudolf Schneider, Reinach, Switzerland

[73] Assignee: Erowa AG, Reinach, Switzerland

[21] Appl. No.: 20,728

[22] Filed: Mar. 15, 1979

[30] Foreign Application Priority Data

Mar. 15, 1978 [DE] Fed. Rep. of Germany ....... 2811274

[51] Int. Cl.³ ............................................. B23P 1/12
[52] U.S. Cl. .............................. 219/69 M; 219/69 V; 219/69 G
[58] Field of Search .................. 219/69 M, 69 V, 109, 219/69 G

[56] References Cited

U.S. PATENT DOCUMENTS

| | | | |
|---|---|---|---|
| 3,538,290 | 11/1970 | O'Connor | 219/69 G |
| 3,727,822 | 4/1973 | Umbaugh | 219/109 |
| 4,104,501 | 8/1978 | Wyss | 219/69 V |
| 4,161,641 | 7/1979 | Bonga | 219/69 V |

*Primary Examiner*—C. C. Shaw
*Attorney, Agent, or Firm*—William R. Hinds

[57] ABSTRACT

The speed at which the electrode on a spark erosion machine approaches the workpiece is controlled in accordance with the continuously measured force on the electrode due to the pressure of the dielectric. This force may be measured by a pre-stressed spring in the traction rod of the electrode carrier or by extension strain measuring strips on said traction rod. Apparatus to which the process is particularly suitable is described.

6 Claims, 2 Drawing Figures

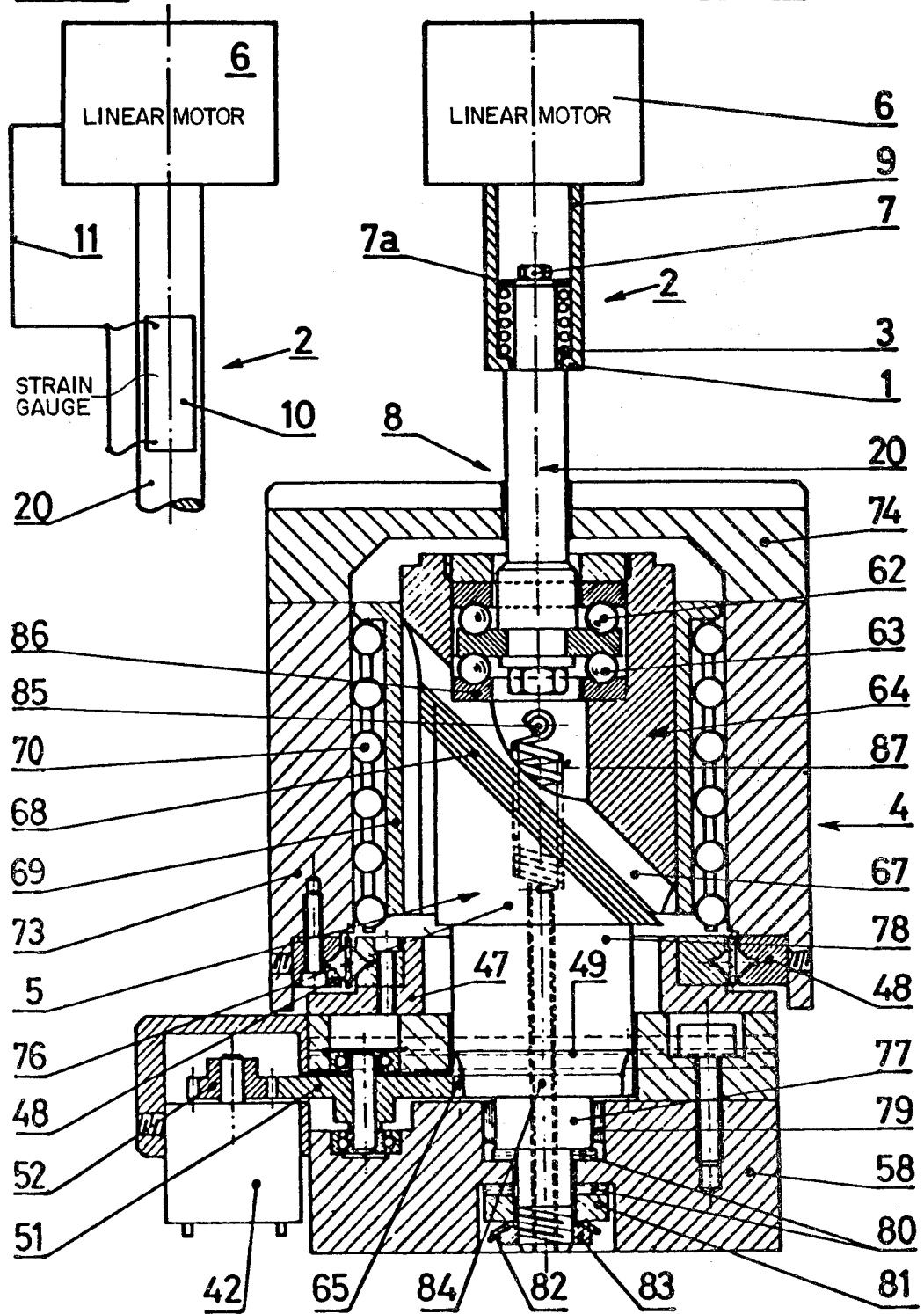

PROCESS AND APPARATUS FOR CONTROLLING THE ELECTRODE ON A SPARK EROSION MACHINE

FIELD OF THE INVENTION

The invention is concerned with a process for controlling the electrode on spark erosion machines, wherein the electrode is displaced within a dielectric until it reaches the required working gap relative to a workpiece to be machined. The invention also concerns apparatus for carrying out the process.

BACKGROUND OF THE INVENTION

In known spark erosion machines, the electrode is moved towards the workpiece to be machined at a constant speed until the desired working gap of a few hundredths of a millimeter is reached, and the electrode is then stopped in order to be advanced at normal machining speed. This rapid approach movement of the electrode causes an extremely high pressure to be built up in the dielectric in the region of the working gap, because the dielectric can only slowly escape because of the small distance between the electrode and the workpiece. The pressure in the dielectric produces a force which opposes the approach movement of the electrode towards the workpiece. In many cases, this force is so high that the electrode or the electrode carrier are damaged.

The constant approach speed of the electrode to the workpiece also results in the electrode running into the workpiece and thus causing a short-circuit which can only be stopped by subsequently retracting the electrode.

An object of the invention is to avoid the disadvantages of the known art, and in particular therefore to provide a process and apparatus in the use of which no pressure peaks are produced in the dielectric and at the same time the forces required for moving the electrode to the workpiece can be reduced to a minimum.

Another object of the invention is to control the approach movement of the electrode towards the workpiece in such a way that no short-circuit can occur during this operation.

The invention also provides apparatus for carrying out the process.

SUMMARY OF THE INVENTION

According to the process of the present invention, the force which acts on the electrode as a result of the pressure in the dielectric is continuously measured and the speed at which the electrode is moved towards the workpiece is varied in dependence on this measured force.

When the pressure in the dielectric increases as a result of excessive approach speed, this arrangement provides in the simplest manner that the pressure in the dielectric does not exceed a given maximum value.

A spark erosion machine for carrying out the process according to the invention comprises an electrode carrier including an electrode holder, the latter being driven by means of an eccentric member so as to perform a circulating, but translatory or rotation-free movement relative to the workpiece. The eccentricity and, therefore, the radial position of the electrode is adjustable or controllable. For this purpose the electrode carrier comprises a shaft to which the said eccentric member is connected for rotation, but displaceable radially in relation to the axis of said shaft. Said eccentric member has a rising ramp surface extending in the longitudinal direction of the electrode carrier and acting as an inclined plane between said shaft and the eccentric member for radial displacement of the electrode holder, said electrode carrier having a control device movable by actuating means for varying the eccentricity of the electrode holder and comprising a vertically movable traction rod arranged rotatably on said shaft, and force measuring means having a controlling action on said actuating means between said actuating means and said control device.

In one embodiment of the invention, a force measuring means comprises a spring which is pre-stressed against an abutment, between the control means and the actuating means, wherein the variation in length of the spring is used as a measurement for the control action.

In another embodiment of the invention, the force measuring means comprises an extension strain measuring strip arranged on the traction rod, and the actuating means are controlled electrically or electronically.

It will be appreciated that the technical advance and the inventive concept of the subject of the present application are provided both by the novel individual features and also in particular by combination of all features employed.

BRIEF DESCRIPTION OF THE DRAWINGS

FIG. 1 is a cross-section of part of a first embodiment of an electrode carrier according to the invention; and FIG. 2 is a view of part of a further embodiment of the invention.

DESCRIPTION OF EMBODIMENTS OF THE INVENTION

Referring to FIG. 1, the electrode carrier 4 comprises an upper section including a housing 73 and a lower section designed to be an electrode holder 58. The electrode itself and the means for connecting it to the holder have not been shown for the sake of clarity, these means being commercially available. The electrode holder 58 is mounted so as to be moveable in relation to the housing 73 in a horizontal plane, i.e., in a plane positioned normal to the vertical axis of the electrode carrier 4. For this purpose, an intermediate part 47 located between housing 73 and holder 58 is connected by means of two rectilinear bearings 48 to housing 73 so as to be movable in relation to said housing 73 in a horizontal direction normal to the plane of FIG. 1. Furthermore, the holder 58 is connected to the said intermediate part 47 by means of a further pair of rectilinear bearings (not shown) so as to be moveable in relation to said intermediate part 57 in a horizontal direction parallel to the plane of FIG. 1. This arrangement, the concept of which is typical of known machines in this art, results in the capability of the electrode holder 58 to move with a circulating translatory movement in relation to housing 73.

For the purpose of controlling the radial position of the electrode holder 58 in relation to the vertical axis of housing 73, a traction rod 20 is connected at its upper end to an actuating means 6 and to a shaft 64 positioned in housing 73 at its lower end. The traction rod 20 is secured rotatably to shaft 64 without clearance in the axial direction, by means of two axial bearing assemblies 62 and 63. The shaft 64 is freely rotatable relative to the rod 20 and is in the form of a hollow shaft, with its lower end face being bifurcated. The bifurcated lower portion of the shaft 64 thus has two sideplate portions, one of them, i.e., sideplate portion 67, being shown in FIG. 1. The said sideplate portions on their inside accommodate one part of two rectilinear guide means 68 which are known as 'Schneeberger longitudinal guide'.

The two guides 68 are disposed precisely one behind the other in the view shown in FIG. 1. The two guides 68 are at an inclined angle relative to the axis of rotation of the shaft 64. In the embodiment illustrated, this angle of inclination is 45°. The shaft 64 is seated in a sleeve 69 on which there is provided a commercially available ball-bearing mounted sleeve 70. The sleeve 70 is also mounted within the housing 73.

The sleeve 70 permits both play-free axial movement and rotary movement of the shaft 64 with sleeve 69, relative to the housing 73. The traction rod 20 passes with clearance through a cover portion 74 of housing 73. The electrode holder 58, which as explained above, is capable of performing a circulating, translatory movement in relation to housing 73 with a variable radial position relatively to the axis of housing 73 or rod 20, is provided for rotatably mounting an eccentric member 5. The eccentric member 5 comprises a right-angled triangular plate 76 to which two shaft journal portions 78 and 77 are successively connected. The components 76, 77 and 78 are of an integral construction.

The eccentric member 5 is mounted rotatably in the electrode holder 58 by means of needle bearing assemblies 79 and 80 so as to be rotatable without clearance in the radial and axial directions. At the upper end, the shaft journal portion 78 is provided with a toothed ring 65 which meshes with an intermediate wheel 51. The intermediate wheel 51 in turn meshes with a pinion 52. The shaft journal portion 78 is rotatably driven by an electric motor 42, secured to the electrode holder 58, through pinion 52, intermediate wheel 51 and the toothed ring 65. A running collar member 81, a securing plate member 82 and a securing nut 83 are provided for holding the eccentric member 5 in the electrode carrier 58 without axial play. The eccentric member 5 has therethrough an axial screw-threaded bore in which an adjusting screw 84 is disposed. One end of a coil tension spring 87 engages the adjusting screw 84 while its other end is mounted on a pin member 85 on the shaft 64. The spring 87 endeavours to pull the rod 20 with shaft 64 downwardly against the eccentric member 5. The hypotenuse of the triangular plate 76 of the eccentric member 5 is provided with the other part of the above-mentioned guide 68. The shaft 64 is therefore connected to the eccentric member 5 by means of the guide 68. In this arrangement, the eccentric member 5 lies with its plate-like portion 76 in the intermediate space in the bifurcated lower end of the shaft 64.

The eccentric member 5 is therefore disposed at the end face of the shaft 64 and the guide 68 which is inclined relative to the axis of rotation of the shaft represents a rising ramp surface between the shaft 64 and the eccentric member 5. Therefore, axial movement of the shaft 64 relative to the housing 73 results in radial displacement of the eccentric member 5 with its electrode holder 58, and thus in adjustment of the degree of eccentricity. More in detail: upward movement of shaft 64 relatively to housing 73, i.e. against the tension force of spring 87, results in a movement of member 5 directed to the right in relation to shaft 64 and housing 73. When starting from a position of shaft journal portions 77 and 78 relatively to shaft 64, in which the axis of said shaft journal portions lies on the right side of the axis of shaft 64 when viewed as in FIG. 1, this movement results in an enlarged degree of eccentricity, and vice versa.

Enlargement of the degree of eccentricity of the electrode holder 58 and thus the approach movement of the electrode (not shown) toward the workpiece to be machined is effected by axial movement of the traction rod 20 by actuating means 6, which may be, for example, a linear motor. The approach movement of the electrode toward the workpiece takes place at a constant high speed until the pressure in the dielectric in the region of the working gap and thereby the traction force at the traction rod reaches a maximum predeterminable limit or maximum value. When this value is exceeded, a force measuring means 2 which comprises a hollow shaft 9 and a spring 3 which is pre-stressed between an abutment 1 on the hollow shaft and a disc member 7A on the traction rod 20 responds in such a way that the spring 3 is compressed and thereby the relative position of rod 20 and hollow shaft 9 is varied. Such displacement of shaft 9 relative to rod 20 is used as, or to create, a measuring signal or magnitude representing the force acting on rod 20. This measuring signal is coupled to actuating means 6 in the sense of a control feed-back loop, as indicated schematically at 11 in FIG. 2. The operation of such control circuit is to limit or reduce the speed of the change in the degree of eccentricity and thus of the approach speed of the electrode toward the workpiece. FIG. 2 shows schematically such a control circuit as already mentioned, and furthermore shows another embodiment of the force measuring means 2. The latter in this case comprises an extension strain measuring strip or gauge 20 which is disposed on the traction rod 20 and immediately delivers a measuring signal representing the force effective on rod 20. The feed-back of the measuring signal is established by means of a signal line 11 supplying said measuring signal to a control input of actuating means 6 which again may be, for example, a linear motor. Amplification of the measuring signal and the construction of the actuating means 6 including control circuitry are well-known in the art and commercially available.

In this way, the speed of the vertical movement of the traction rod 20 is reduced when a maximum predeterminable traction force at the traction rod 20 is exceeded. This causes the traction force at rod 20 and thus also the force acting on the electrode to be reduced. This allows for an effective force and pressure limitation to a desired maximum value.

It will be appreciated that many modifications may be made in the apparatus according to the invention. Thus, for example, any known force measuring means which forms part of the state of the art can be readily used without thereby departing from the scope of the invention.

I claim:

1. A process for controlling the electrode on a spark erosion machine, wherein the electrode is subjected to a drive force advancing the electrode within a dielectric fluid until it reaches the required working gap relative to a workpiece to be machined, wherein the force acting on the electrode due to the drive force and the pressure in the dielectric fluid is measured and the advancing speed at which the electrode is moved towards the workpiece is controlled in dependence on said measured force such that the said force is limited to a predetermined value.

2. A process as defined in claim 1, wherein after reaching the desired machining depth, the electrode is adjusted, by forming a crank of variable eccentricity until the required working gap is reached, and the speed of the change in the degree of eccentricity is controlled in dependence on said measured force applied to the electrode.

3. Apparatus for controlling the electrode on a spark erosion machine, wherein the electrode is connected by coupling means with drive force means for advancing the electrode within a dielectric fluid until it reaches the required working gap relative to a workpiece to be machined, said apparatus comprising an electrode carrier, said carrier including an electrode holder, a shaft, at least one rotatably mounted eccentric member mounted to be radially displaceable relative to said shaft, said member having a rising ramp surface extending in the direction of the longitudinal axis of the electrode carrier and acting as an inclined plane between said shaft and the eccentric member for effecting radial adjustment of the electrode holder upon relative axial displacement of said eccentric member and said shaft, said electrode carrier having a control means movable by actuating means for varying the eccentricity of the electrode holder and comprising an axially movable traction rod arranged rotatably on said shaft, and force measuring means having a controlling action on said actuating means, said force measuring means being located at the said coupling means between said drive force means and the electrode and controlling said actuating means in response to the measured force acting on the electrode due to the drive force and the pressure in the dielectric fluid so as to limit the force to a predetermined value.

4. Apparatus as claimed in claim 3, wherein the force measuring means comprises a spring pre-stressed against an abutment on a hollow shaft carried by said actuating means and against an opposing surface carried by said traction rod.

5. Apparatus as defined in claim 3, wherein the force measuring means comprises extension strain measuring strips connected with said coupling means between said drive force means and the electrode.

6. In a spark erosion machine having drive means for advancing an electrode within a dielectric fluid until it reaches the required working gap relative to a workpiece to be machined, the improvement comprising means for measuring the force acting on the electrode as a result of the drive force of said advancing means and the pressure in the dielectric fluid between the electrode and the workpiece as the electrode approaches the workpiece, and for controlling the speed at which the electrode is moved toward the workpiece in dependence on said measured force such that said force is limited to a predetermined value.

* * * * *